US007878098B2

(12) United States Patent
Wallace

(10) Patent No.: US 7,878,098 B2
(45) Date of Patent: Feb. 1, 2011

(54) PLUNGE CUT PAPER ROLL CONVERTER

(75) Inventor: Marcus T. Wallace, Murfreesboro, TN (US)

(73) Assignee: P&M Services, Inc., Tullahoma, TN (US)

( * ) Notice: Subject to any disclaimer, the term of this patent is extended or adjusted under 35 U.S.C. 154(b) by 102 days.

(21) Appl. No.: 10/358,090

(22) Filed: Feb. 4, 2003

(65) Prior Publication Data

US 2003/0172787 A1 Sep. 18, 2003

Related U.S. Application Data

(60) Provisional application No. 60/354,383, filed on Feb. 4, 2002, provisional application No. 60/357,875, filed on Feb. 19, 2002, provisional application No. 60/397,335, filed on Jul. 19, 2002.

(51) Int. Cl.
*B26D 7/06* (2006.01)
*B26D 1/12* (2006.01)

(52) U.S. Cl. .............................. 83/27; 83/102; 83/663; 83/674; 83/675; 83/733

(58) Field of Classification Search .................. 83/27, 83/160, 801, 574, 159, 102, 862, 100, 63, 83/471.1, 471.2, 76.8, 56, 440, 924, 490, 83/411.1, 54, 411.3, 796, 614, 425.4, 733, 83/466.1, 516, 13, 649, 650, 788, 83, 46, 83/59, 101, 47, 48, 52, 53, 122, 84, 99.2, 83/91, 86, 98, 663, 674, 675; 82/83, 46, 82/59, 101, 47, 48, 52, 53, 122, 27, 160, 82/801, 574, 159, 102, 862, 100, 63, 471.1, 82/471.2, 56, 76.8, 924, 411.1, 54, 411.3, 82/796, 614, 425.4, 733, 466.1, 516, 13, 82/490, 649, 650, 788, 84, 99.2, 91, 86, 98; 29/558, 29; 409/166, 15; 144/48, 3.1, 38; 142/26, 48, 55, 56

See application file for complete search history.

(56) References Cited

U.S. PATENT DOCUMENTS

| | | | | | |
|---|---|---|---|---|---|
| 871,828 | A | * | 11/1907 | Sexton | 82/83 |
| 1,151,527 | A | * | 8/1915 | Lewis | 83/434 |
| 1,892,246 | A | * | 12/1932 | Mohns | 144/73 |
| 2,738,841 | A | * | 3/1956 | Jones | 83/462 |
| 2,977,128 | A | | 3/1961 | Judelson | |
| 3,148,570 | A | * | 9/1964 | Bogert | 82/53 |
| 3,161,097 | A | * | 12/1964 | Judelson | 82/48 |
| 3,218,894 | A | * | 11/1965 | Chow | 82/101 |

(Continued)

OTHER PUBLICATIONS

European Search Report for PCT/US0303259 dated Mar. 17, 2010.

*Primary Examiner*—Ghassem Alie
(74) *Attorney, Agent, or Firm*—Rader, Fishman & Grauer, PLLC

(57) ABSTRACT

An apparatus for cutting a roll of material includes an elongated blade having a distal end, a cutting guide attached to the elongated blade and positioned to direct the distal end of the elongated blade towards the roll of material, and a support position to hold the roll of material approximate to the elongated blade. A method for cutting a roll of material having an axis and a circumference includes radially cutting the roll of material from the circumference to the axis by advancing the distal end of an elongated blade, then rotating the elongated blade relative the axis to cut the roll of material. Alternately, the method teaches rotating the roll of material relative to the axis to cut the roll of material.

7 Claims, 10 Drawing Sheets

U.S. PATENT DOCUMENTS

| | | | | |
|---|---|---|---|---|
| 3,233,306 | A * | 2/1966 | Kessel et. al. | 407/117 |
| 3,323,561 | A * | 6/1967 | Lahtinen | 30/383 |
| 3,522,748 | A | 8/1970 | Treffner | |
| 3,752,024 | A * | 8/1973 | Judelson | 82/86 |
| 3,871,255 | A * | 3/1975 | Nisula | 83/155 |
| 3,933,347 | A * | 1/1976 | Stoffels | 269/31 |
| 3,938,671 | A * | 2/1976 | Lewey et al. | 414/684 |
| 4,046,038 | A * | 9/1977 | West | 82/47 |
| 4,048,720 | A * | 9/1977 | Wheeler | 30/372 |
| 4,152,958 | A | 5/1979 | Bogert | |
| 4,205,573 | A * | 6/1980 | D'Angelo et al. | 83/733 |
| 4,216,686 | A * | 8/1980 | Stoffels | 82/53 |
| 4,217,799 | A * | 8/1980 | Faris | 82/1.11 |
| 4,235,140 | A * | 11/1980 | Reece | 83/794 |
| 4,292,867 | A * | 10/1981 | Stoffels et al. | 82/47 |
| 4,326,703 | A * | 4/1982 | Marley | 269/156 |
| 4,579,025 | A | 4/1986 | Fasolak | |
| 4,641,822 | A * | 2/1987 | Fenerty | 269/296 |
| 4,819,335 | A | 4/1989 | Alexander | |
| 4,887,357 | A * | 12/1989 | Alexander | 30/383 |
| 4,901,611 | A * | 2/1990 | Bentley | 82/100 |
| 5,038,647 | A | 8/1991 | Biagiotti | |
| 5,060,456 | A | 10/1991 | Wehrli | |
| 5,078,119 | A * | 1/1992 | Holmes et al. | 125/13.01 |
| 5,453,070 | A * | 9/1995 | Moody | 493/288 |
| 5,690,007 | A * | 11/1997 | Strange et al. | 82/70.1 |
| 5,857,391 | A * | 1/1999 | Renstrom | 82/101 |
| 5,878,800 | A * | 3/1999 | Young | 144/372 |
| 5,946,992 | A * | 9/1999 | Ozawa | 82/48 |
| 5,964,024 | A | 10/1999 | Wallace | |
| 6,178,960 | B1 * | 1/2001 | Svensson | 125/21 |
| 6,202,520 | B1 * | 3/2001 | Cardemon | 82/1.11 |
| 6,269,719 | B1 * | 8/2001 | Easton et al. | 83/54 |
| 6,282,766 | B1 | 9/2001 | Wallace | |
| 6,405,623 | B2 | 6/2002 | Lavallee | |
| 6,575,071 | B1 * | 6/2003 | Atkins | 83/745 |
| 7,069,632 | B2 * | 7/2006 | Ferdolage | 29/27 A |
| 2005/0022643 | A1 * | 2/2005 | Weidner | 83/27 |
| 2005/0166376 | A1 * | 8/2005 | Ferdolage | 29/27 A |

* cited by examiner

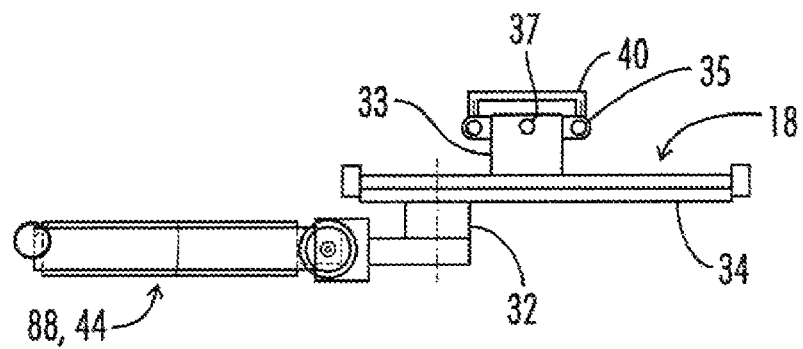
FIG. 14A
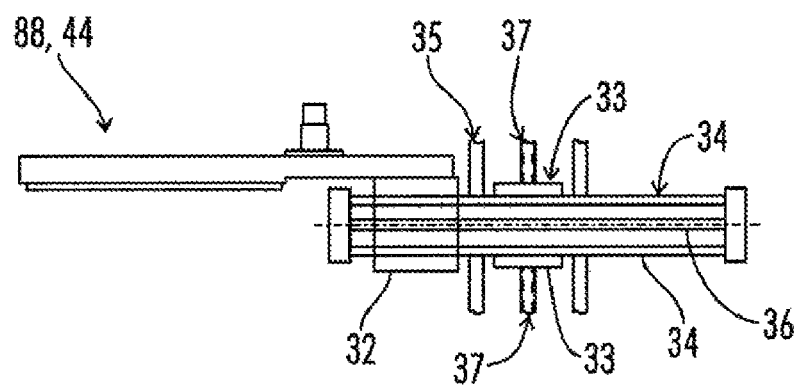
FIG. 14B
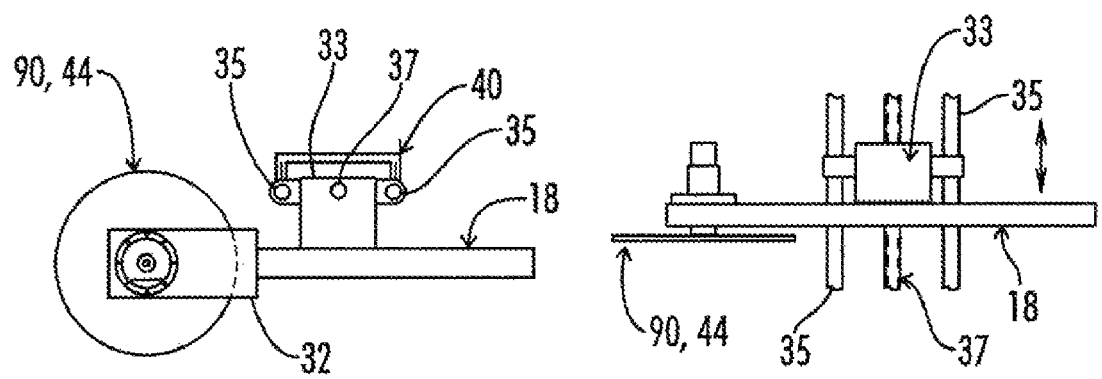
FIG. 15A
FIG. 15B

PLUNGE CUT PAPER ROLL CONVERTER

APPLICATION FOR UNITED STATES LETTERS PATENT

This application claims benefit of U.S. Provisional Patent Application Ser. No. 60/354,383 filed Feb. 4, 2002, entitled "Vertical Roll Cutter"; U.S. Provisional Patent Application Ser. No. 60/357,875 filed Feb. 19, 2002, entitled "Vertical Orientation Plunge Cut Roll Sizer"; and U.S. Provisional Patent Application Ser. No. 60/397,335 filed Jul. 19, 2002, entitled "Horizontal Chain Saw Based Paper Roll Divider"; which all three are hereby incorporated by reference.

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

Be it known that I, Marcus T. Wallace, a citizen of the United States, residing in Murfreesboro, Tenn.; have invented a new and useful "Plunge Cut Paper Roll Converter."

FIELD OF THE INVENTION

The present invention relates generally to a roll converter machine and more particularly to a device for cutting and finishing a paper roll or similar sheet products supplied in large rolls.

BACKGROUND OF THE INVENTION

In a number of industries, sheet products are provided in large heavy and bulky rolls. Often in the paper printing industry, rolls of paper are not provided at a specific length for the desired printing operation. For example, printing products, such as newspapers, may have a desired width of 32 inches or 44 inches and the only paper roll that is available is a large roll measuring 120 inches wide. Therefore, an effective way of cutting the large roll of paper to the desired width is needed.

In addition, sometimes during the handling and storage of the large rolls, the ends of the rolls become damaged, deformed, or otherwise uneven making the roll unusable unless the damaged area is removed and refinished. More severe instances of paper damage can be caused by liquids leaking or spilling into the storage container area housing the roll of paper. For example, water can appear in the storage area from roof leaks or sprinkler discharges. The liquid absorbs into the paper causing the paper to soften, deform and bulge. In some instance, one or both ends of the paper as well as the circumferential sides of the roll of paper might be damaged due to the liquid. This type of damage requires the converting of a relatively large amount of material from each end of the roll in order to salvage the undamaged area of the roll. In some instances, the removal operation of must be performed in buildings having limited overhead clearances.

Presently, several known devices and methods are used in the industry to cut large rolls of material. However, most of these known methods and devices have numerous drawbacks and are limited in scope. For example, U.S. Pat. No. 6,269,719 entitled "Roll Trimming Machine" issued to Easton uses a cutting blade to grind off the end of the roll that is to be removed. This prior art device renders the section of the roll that is severed from the main part of the roll of material useless. This type of device limits the effectiveness and usefulness because they are incapable of removing large sections of the roll of material without damage to the material removed.

Most of the prior art devices also lack the capability of interchanging cutting elements to facilitate different types of cuts made on the rolls of material being cut. The ability to change the cutting apparatuses allow a varying degree of finishes to be applied to the ends of the rolled material as required by the particular needs of a application in which the rolls of materials will be used.

Prior art devices that use an elongated blade, or chainsaw, to cut a roll of material use the elongated side of the blade to cut the roll of material. For example, the L-M Equipment Co. Ltd. Model PS 150-7-404 HC "Paper Cut Off Saw" cuts with the portion of the chain that is along the longest axis on the elongated blade. This device uses the side of the chain saw that is parallel to the longest axis of the chain saw to make the initial incision into the rolled material. This device also uses this same area to continue the cut through the roll of material. None of the chain saw type prior art devices use the distal end, or the portion of the chain saw that is parallel to the shortest axis of the chain saw to make the cut into the roll of material. In fact, the L-M Equipment Co. device covers the distal end of the chain saw and effectively eliminates this portion of the chain saw as a cutting edge.

What is need, then, is an apparatus and method for cutting large rolls of material, such as rolls of paper, into a multiplicity of smaller sized rolls at one location. The apparatus should be capable of handling a various size rolls as well as aligning the roll of material if damaged to the roll necessitates such realignment. This device should be capable of removing damaged portions of the rolls without damaging the remainder of the roll. This device should be able to finish and sand the edge of a roll and be able to support the roll in various positions.

SUMMARY OF THE INVENTION

This patent teaches an apparatus for plunge cutting a roll of material, comprising an elongated blade having a distal end, a cutting guide attached to the elongated blade and positioned to direct the distal end of the elongated blade towards the roll of material, and a support position to hold the roll of material approximate to the elongated blade.

A method for plunge cutting a roll of material having an axis and a circumference is also taught. The method comprises radially cutting the roll of material by advancing the distal end of an elongated blade into the roll of material, then rotating the elongated blade relative to the axis to cut the roll of material. Alternately, the method teaches rotating the roll of material relative to the axis to cut the roll of material.

The invention is designed to convert, or resize, a large roll of rolled sheet material, such as paper, paper products, sheet plastic, foil, or sheet composite material into desired lengths and widths. This disclosure teaches at least three embodiments of an apparatus design to accomplish this task. Several methods of accomplishing this task are also provided. In these embodiments and methods, the invention at least encompasses plunge cutting a roll of material with an elongated blade.

In a first embodiment, the invention includes a housing that is attached to a support. The support comprises a turntable, also called a platform or pier, and a post. The turntable, upon which the roll of material is placed, includes a horizontal surface that may rotate in either direction relative to the post. In this embodiment the rotation of the roll of material on the turntable facilitates the cutting of the roll of material by the apparatus.

Affixed to the surface of the turntable are support pads that are vertically adjustable. The support pads are adjustable in a manner to allow the central axis of the roll of the material to be placed perpendicular to the turntable. On the edge of the turntable is a plurality of positioning clamps used to engage the roll of material on its exterior surface and hold the roll of material on the turntable. The positioning clamps are used to maintain the alignment of the roll of material and to secure the roll of material during the cutting process.

Attached to the housing is at least one stanchion, or tower. The stanchion houses at least one cutting element used to sever the roll of material. The cutting elements include an elongated blade, which can also be described as a chain saw, used to make an initial cut into the roll of material. The at least one stanchion, or an alternate stanchion, can include a finishing device used to finish, which is also known as finely cutting or detailing, the end of the roll of material once the chain saw has made the initial cut of the roll of material. The finishing device can include several rotating cutters or sanders used to detail, cut and finish the rolled material.

The stanchions include cutting guides and position guides that allow horizontal and vertical adjustment of the cutting elements to desired positions relative to the roll of material. This allows a user of the apparatus to divide the roll at numerous locations along the length of the roll of material.

In an alternate embodiment, the turntable supports the stanchions and cutting elements and is used to rotate the stanchions and cutting elements relative to the roll of material. In this embodiment, a horizontal stationary pier, or platform, would be used to support the roll of material. A column extending from the platform to the housing, or base, would be used to support the roll of material. The connection between the turntable and the platform includes a bearing assembly that is used to rotate the cutting elements relative to the roll of material.

The connection between the stanchions and the turntable includes support beams. The support beams would be used to support the weight of the cutting elements. An additional stanchion supporting the power unit for the apparatus could counterbalance the weight of the cutting elements. On this second stanchion could also be a particle collection device used to collect the bits of material as the roll of material is cut or finished. This embodiment can also include an additional stanchion that could house an operational area maintained by user of the apparatus to facilitate operation of the apparatus. The stanchions could include position guides to horizontally and vertically position the elements housed on each stanchion, namely the cutting elements, the particle removing devices, and the operator of the apparatus, with respect to the roll of material.

In still another embodiment of this invention, the housing includes a plurality of guide rails lying in a horizontal plane to which is affixed to a series of support wheels, or rollers. The support wheels are used to support the roll of material when the roll of material is lying in a horizontal plane. The support wheels hold the roll of material as a whole and the individual sections of the roll of material once the individual sections are divided. These support wheels are also used to rotate the roll of material about its horizontal central axis.

This second alternate embodiment could also include end supports affixed to the housing. These end supports include horizontally and vertically adjustable end support spindles that will allow support and rotation of the roll of the material from its central axis independently from the support wheels. These support spindles are horizontally and vertically adjustable to adapt to numerous lengths and diameters of a variety of rolls of material. The support spindles also allow connection and operation of various cutting elements that can be used to finely cut, or finish, the end of the roll of materials as is required by the various applications of the rolls of material.

Also affixed to the housing is at least one adjustable rail that is offset from the support wheels. The at least one adjustable rail has at least one stanchion to which is attached at least one carriage, or cutting guide, that supports a cutting element used to cut the roll of material. The carriage is positioned such that when an elongated blade, or a chainsaw, is used as a cutting element the elongated blade will plunge cut the roll of material. Then the support wheels rotate the roll of material until the roll of material is divided.

Finishing devices can also be attached to the carriages that are supported by the stanchions to provide detailed cutting on the rolls of material as required by the particular applications to which the roll of materials are to be used.

Therefore, it is a general object of the present invention to provide an apparatus for cutting a roll of material.

Another object of the present invention is to provide an apparatus that cuts a roll of material within specific tolerances for specific uses of the roll of material.

Still another object of the present invention is to provide an apparatus that uses an elongated blade to cut a roll of material.

Yet another object of the present invention is to provide an apparatus that has an initial cut and then a secondary, finishing cut on a roll of material.

Another object of the present invention is to provide an apparatus that cuts a roll of material into sub-sections that are useable as rolls of material.

Still another object of the present invention is to provide an apparatus that plunge cuts a roll of material.

Yet another object of the present invention is to provide a method for plunge cutting a roll of material.

Numerous other objectives, features and advantages of the present invention will be readily apparent to those skilled in the art, upon a reading of the following disclosure, when taken in conjunction with the drawings.

BRIEF DESCRIPTION OF THE DRAWINGS

FIG. 4C shows the elongated blade protected, or retracted, within a sheath type cover comprising a portion of the cutting guides.

FIG. 5B includes an embodiment of the adjust pads and the spacers used to help manipulate the roll of material.

FIG. 7 shows the support comprising a rotating turntable including a horizontal platform having circumferential fasteners and adjustment pads.

FIG. 8A shows the roll of material not in perpendicular alignment with the horizontal turntable due to a damaged area on the roll of material.

FIG. 8B shows the adjustment pads as well as fastening clamps placing the roll material in correct alignment.

FIG. 9 shows the elongated blade pointed at the roll of material.

FIG. 10 shows multiple stanchions supported by adjustable rails located adjacent to the horizontal guide rails.

FIG. 11 shows a finishing device attached to an end support.

FIG. 11 shows a finishing device supported on a stanchion adjacent to the roll of material.

FIG. 14A shows a partial plan view of one embodiment of the cutting guides and the positioning guides used in the conjunction with a planner or rotary drum type cutting element of the current invention.

FIG. 14B shows a partial side view of the planner or rotary drum type cutting element shown in FIG. 14A.

FIG. 15A shows a partial plan view of one embodiment of the cutting guides and the positioning guides used in the conjunction with circular saw blade or sand disc cutting element of the current invention.

FIG. 15B shows a partial side view of the circular saw blade or sand disc cutting element shown in FIG. 15A.

DESCRIPTION OF THE PREFERRED EMBODIMENTS

Figure 1:
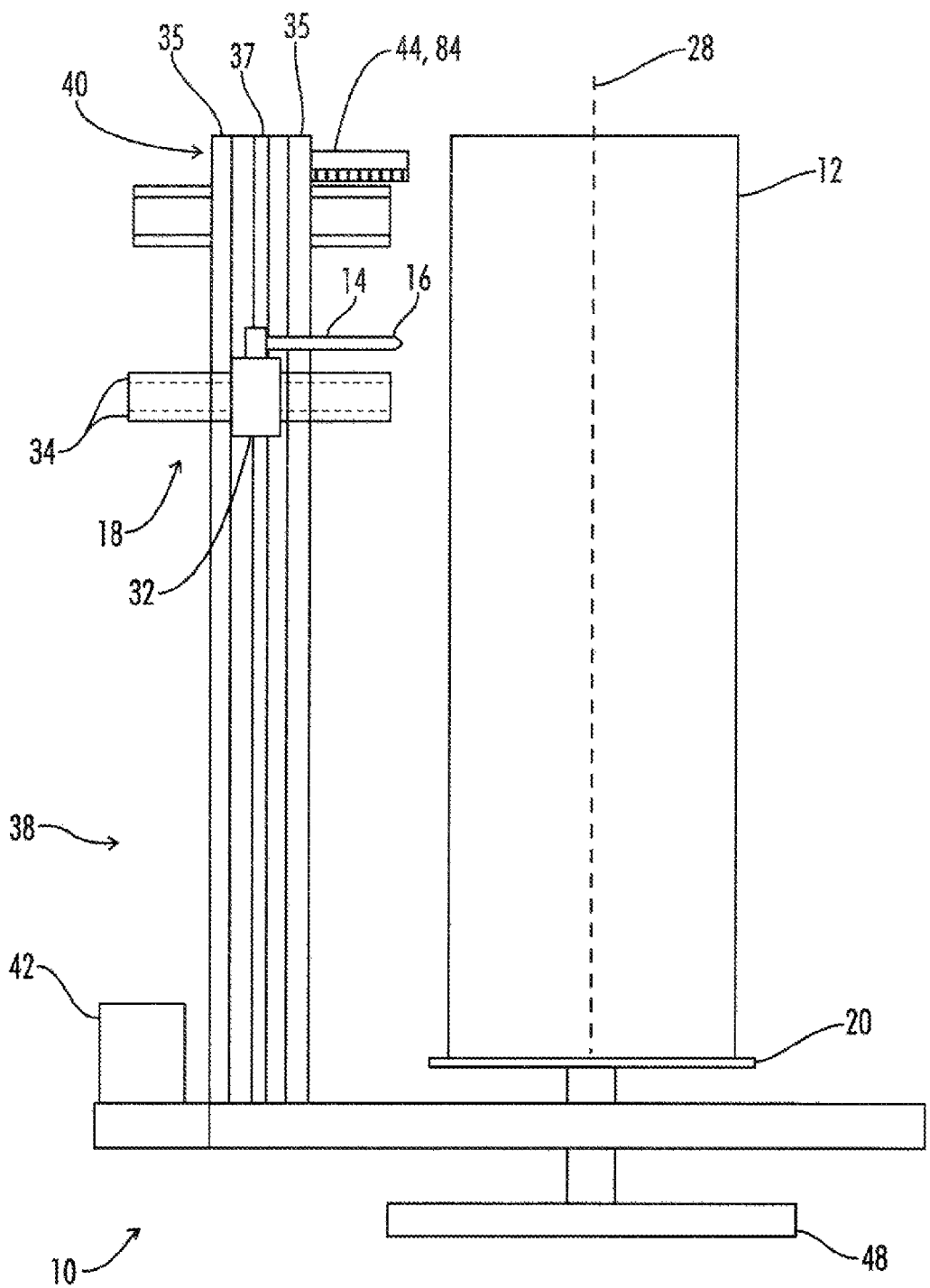
FIG. 1 is a schematic side view of one embodiment of the current invention shown with a roll of material on a rotating turntable and multiple cutting elements on a stanchion.

Referring now to FIG. 1, the first embodiment of the apparatus of the current invention is generally designated by the numeral 10. The apparatus is an apparatus 10 for cutting a roll of material 12 comprising an elongated blade 14, also known as a chainsaw 14, having a distal end 16, a cutting guide 18 attached to the elongated blade 14, and a support 20 positioned to hold the roll of material 12 proximate to the elongated blade 14. The cutting guide 18 is positioned to direct the distal end 16 of the elongated blade 14 towards the roll of material 12. The support 20 rotates the roll of material 12 in either a clockwise or counterclockwise direction after the elongated blade 14 has engaged the roll of material 12 to facilitate cutting of the roll of material 12. In this embodiment, the elongated blade 14 is held stationary as the support 20 rotates the roll of material 12. As seen in FIG. 5C, the elongated blade 14 includes a chain 22 and a set of cutting teeth 24 positioned on the chain 22 to cut the roll of material 12

Figure 5A:
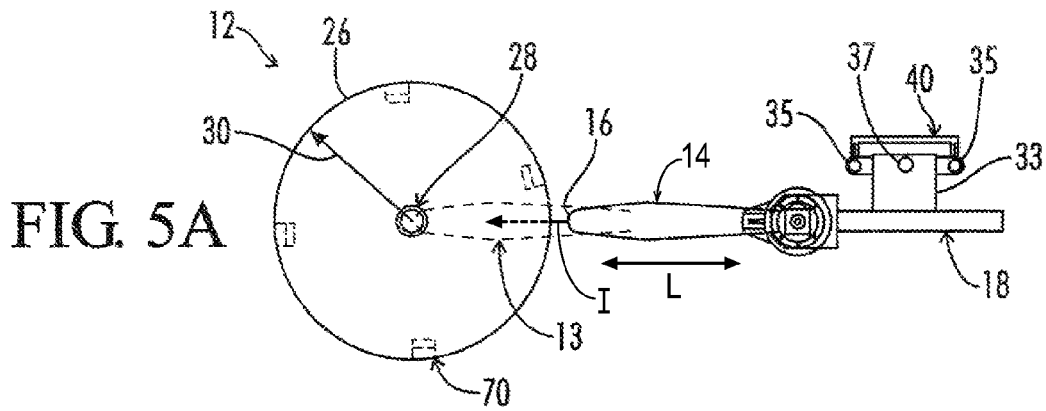
FIG. 5A is an isolated top-view showing an example of the relationship between the elongated blade and the roll of material before and after a plunge cut. The dotted shape in FIG. 5A shows a possible location of the elongated blade after a plunge cut.
Figure 5B:
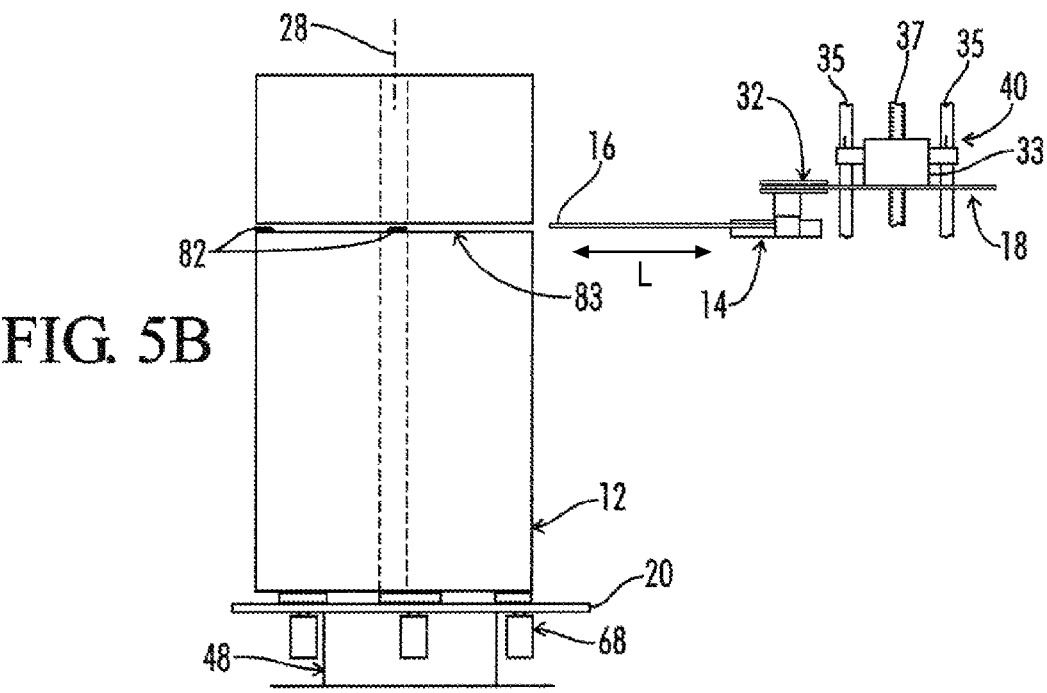
FIG. 5B is an isolated side view similar to FIG. 5A.
Figure 5C:
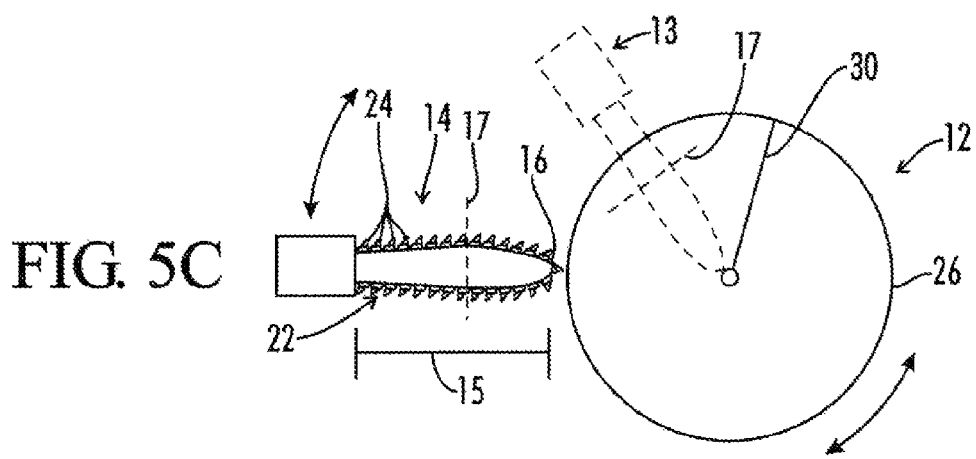
FIG. 5C is an isolated top-view similar to FIG. 5A showing an example of the relationship between the elongated blade and the roll of material before and after a plunge cut. The dotted shape in FIG. 5C shows a possible location of the elongated blade after a plunge cut and then a partial rotation of the elongated blade, the roll of material, or both.

As seen in FIGS. 5A-5C, the cutting guide 18 is designed to direct the distal end 16 of the elongated blade 14 toward the roll of material 12. The distal end 16 is the end of the elongated blade 14 that is located generally parallel to the shortest axis 17 of the elongated blade 14 and is substantially arcuate in shape. The apparatus 10 plunge cuts the roll of material 12, which is defined as cutting the roll of material 12 with the portion of the chain that crosses the distal end 16 of the elongated blade 14. In a preferred embodiment, the apparatus 10 directs the distal end 16 of the elongated blade 14 to engage the circumference 26 in a substantially perpendicular manner. It can also be described that the cutting guide 18 directs the distal end 16 of the elongated end 14 at the central axis 28 of the roll of material 12 along a radius 30 of the roll of material 12. Thereby, the distal end 16 of the elongated blade 14 is the first portion of the elongated blade 14 of the apparatus 10 to engage the roll of material 12 as the apparatus 10 cuts the roll of material 12. The dotted shapes 13 in FIGS. 5A and 5C show a possible location of the elongated blade 14 after a plunge cut It is preferred that the plunge cut occurs along a radius 30 of the roll of material 12 and that it extends from the circumference 26 to the central axis 28 of the roll of material 12. However, it is possible to plunge cut the roll of material 12 wherein the elongated blade does not follow directly along the radius 30. The plunge cut does not have to terminate at the central axis 28, nor does the plunge cut have to be directed precisely at the central axis 28. Also, it is not a necessity that the elongated blade 14 perpendicularly intersects the roll of material 12 during the plunge cut. It is also possible to plunge cut the roll of material 12 to a depth such that the distal end 16 of the elongated blade 14 does not reach the central axis 28 of the roll of materially.

In a preferred embodiment as seen in FIGS. 5A and 5B, the length 15 of the elongated blade 14 should to be at least equal to the radius 30 of the roll of material 12 to be cut. This allows the elongated blade 14 to cut from the circumference 26 of the roll of material 12 to the central axis 28 of the roll of material 12. However, the length 15 can be as long as the size of cut the user desires to make.

Figure 4A:
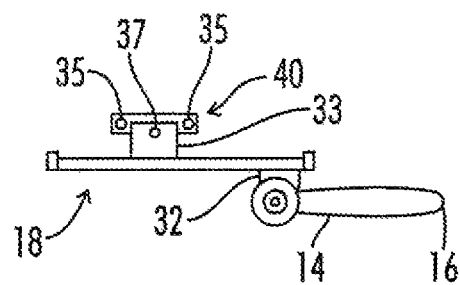
FIG. 4A shows a partial plan view of one embodiment of the cutting guides and the positioning guides used in the conjunction with the chain saw cutting element of the current invention.
Figure 4C:
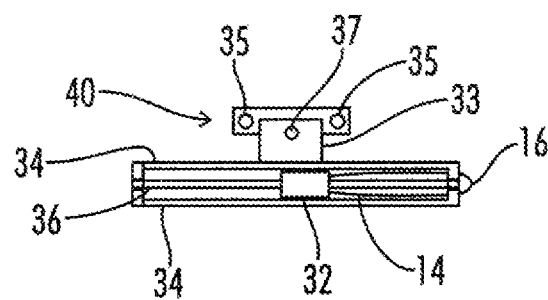
FIG. 4C shows a partial plan view of alternate embodiment of the cutting guides and the positioning guides.
Figure 4B:
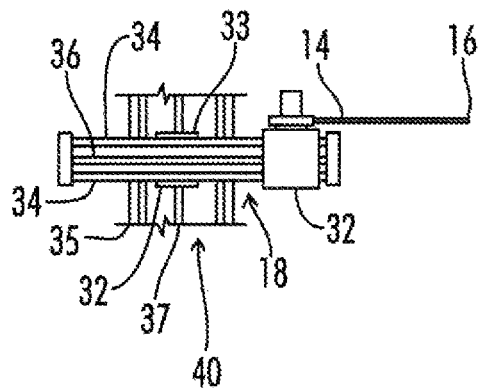
FIG. 4B shows a partial side view of the cutting guides and the positioning guides shown in FIG. 4A.
Figure 4D:
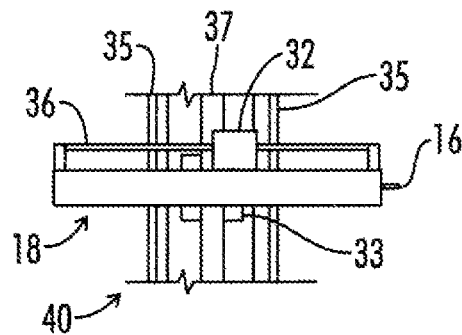
FIG. 4D shows a partial side view of the cutting guides and the positioning guides shown in FIG. 4C.

In a preferred embodiment seen in FIGS. 4A and 4B, the cutting guide 18 comprises a carriage 32, guide rails 34, and a translation device 36. The translation device 36 can comprise several movement devices known by one skilled in the art to impart movement, including, but not limited to, a ball screw, a chain, a motor, a cylinder, and the like. A combination of guide rails 34 and translation devices 36 can be used to horizontally and vertically position the elongated blade 14 with respect to the roll of material 12. This positioning, along with the plunge cut, allows the section of material cut from the roll of material to retain the overall integrity the section enjoyed before it was severed. For example, characteristics such as the compact nature, the band strength, the circumference, and others are maintained in the severed section.

Figure 2:
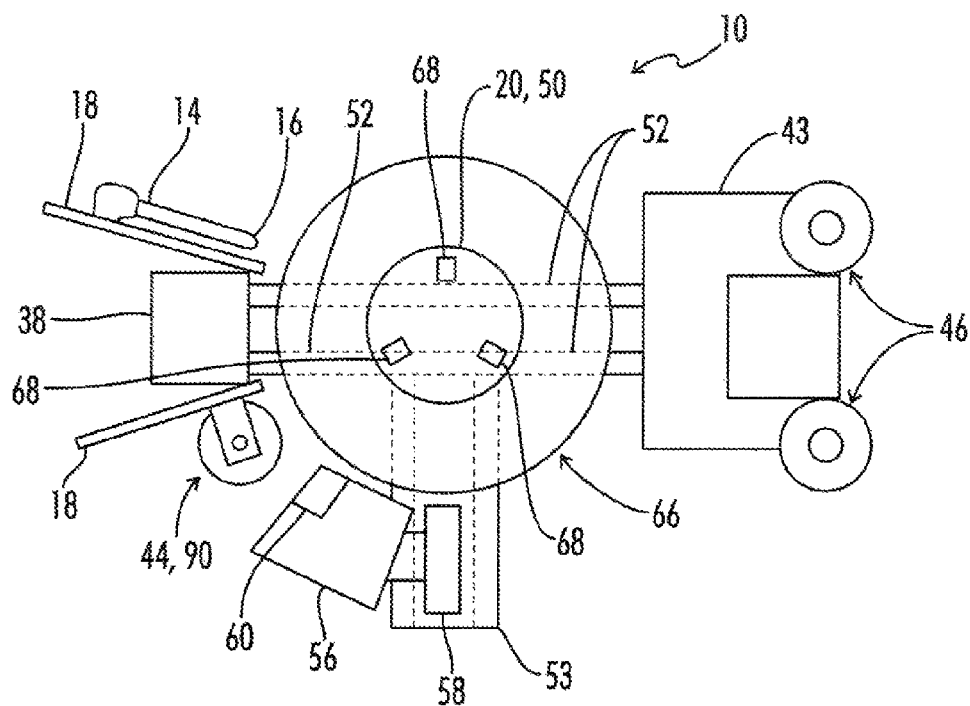
FIG. 2 is a plan view of an alternate embodiment of the current invention shown with multiple towers, multiple cutting elements, a particle collection device, and an operating station. In this embodiment, the stationary platform includes adjustable pads designed to correctly position a roll of material with respect to the other rotating towers and the elements that the towers support.
Figure 3:
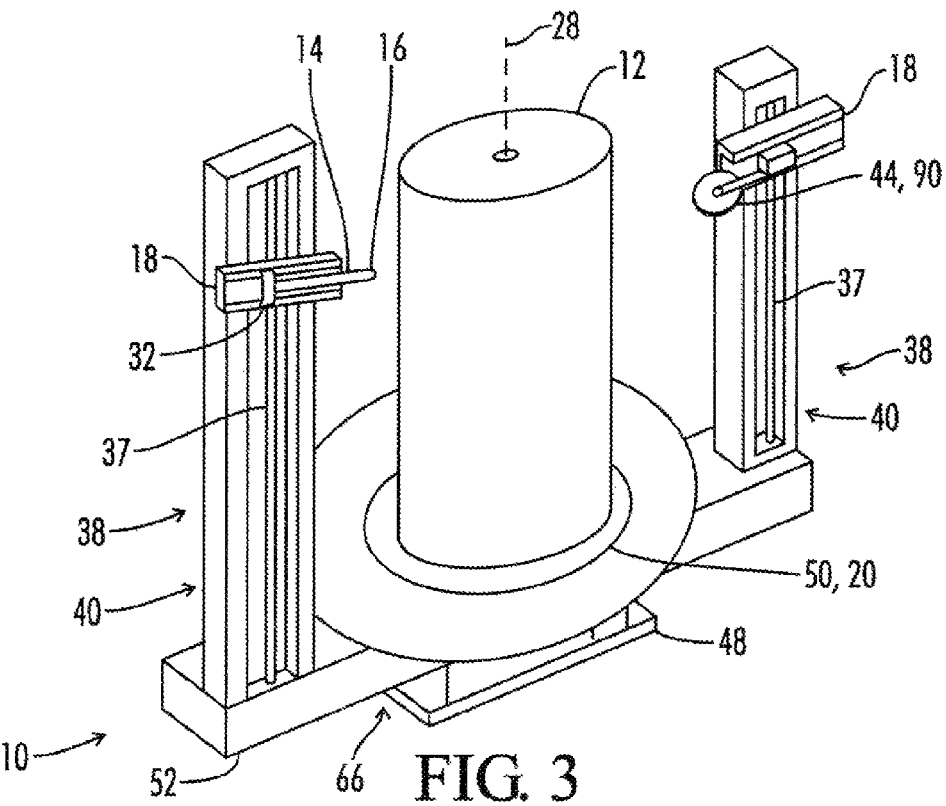
FIG. 3 is a schematic perspective view of still another embodiment of the current invention. This embodiment is shown with multiple stanchions supporting a variety of cutting elements. Both the roll of material and the cutting elements can rotate to facilitate the cutting of the roll.
Figure 6:
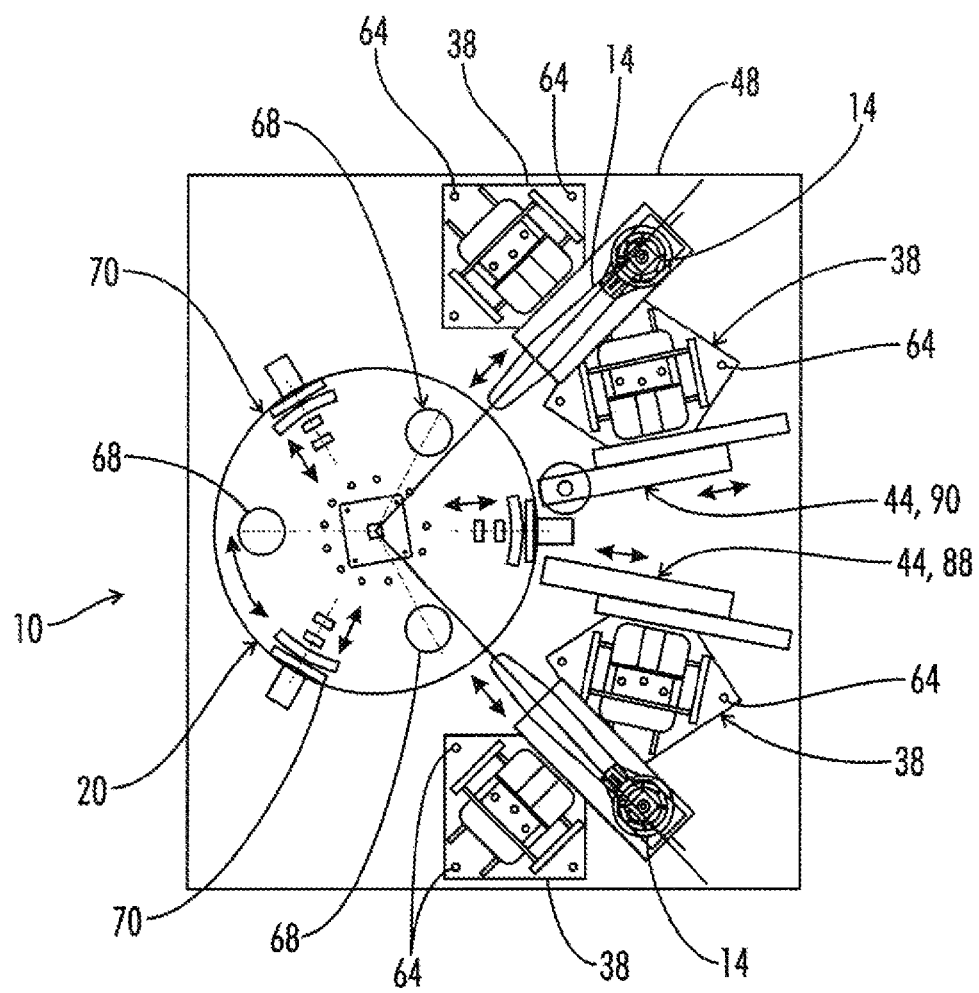
FIG. 6 is a schematic plan view of a fourth alternate embodiment of the current invention shown with multiple towers housing several cutting elements. The towers are positioned around a rotatable turntable that would hold and rotate the roll of material for cutting.

Referring again to FIG. 1, the apparatus 10 further includes a stanchion 38, which can also be described as a tower 38, attached to the cutting guide 18. The stanchion 38 includes at least one position guide 40 located on the stanchion 38 to vary the position of the cutting guide 18 and the elongated blade 14 relative to the roll of the material 12. As seen in FIGS. 2, 3 and 6, multiple stanchions 38 can be used to house various cutting elements, namely elongated blades 14 and finishing devices 44.

The position guide 40 comprises a carriage 33, guide rails 35, and a translation device 37. The translation device 37 can comprise several movement devices known by one skilled in the art to impart movement, including, but not limited to, a ball screw, a chain, a motor, a cylinder, and the like. A combination of position guides 40 and cutting guides 18 can be used to horizontally and vertically position the cutting guide 18 and elongated blade 14 with respect to the roll of material 12. The combination of the position guide 40 and cutting guide 18 can utilized to cut numerous sizes and shapes of rolls of material 12 at varied engagement angles.

The apparatus 10 further includes a motor 42 designed to operate the various movement aspects of the apparatus 10. The motor 42 can be located at numerous locations on the apparatus 10, including, but not limited to, proximate to a stanchion 38 or within the housing 48 to facilitate a smaller footprint space for the apparatus 10. The apparatus 10 can also include a power unit 43 that houses the motor 42. The power unit 43 can include electrical or fluid power elements known in the industry to produce motion from energy.

As seen in FIG. 1, the motor 42 can be operatively attached to the support 20 to rotate the support 20 and the roll of material 12 relative to the elongated blade 14. As seen in FIG. 2, in an alternate embodiment the motor 42 can be attached the cutting guide 18, the stanchion 38, and the elongated blade 14 to rotate the cutting guide 18, the stanchion 38, and the elongated blade 14 relative to the roll of the material 12. As seen in FIG. 3, in still another alternate embodiment of this invention a first motor 42 can be attached the cutting guide 18, the stanchion 38, and the elongated blade 14 to rotate the cutting guide 18, the stanchion 38, and the elongated blade 14 in one direction while a second motor (not shown) is attached to the support 20 to rotate the support 20 and the roll of material 12 in the opposite direction. The various embodiments of the invention may vary the particular element of the apparatus 10 that rotates during the completion of the cutting of the roll of material 12 by the chainsaw 14. However, in these embodiments the apparatus 10 still plunge cuts a roll of material 12.

The apparatus 10 further includes a finishing device 44 positioned proximate to the cutting guide 18 and the support 20 to finish, or acutely cut, the roll of material 12. In one embodiment, the finishing device 44 is removably attached to stanchion 38 to facilitate detailed cutting of the roll of material 12 to match the final tolerances required for the particular uses of the roll of material 12. The carriage 32 of the cutting guide 18 is designed to be interchangeable with multiple finishing devices 44. This availability of a multiplicity of finishing devices 44 allows a user of the apparatus 10 to create detailed finishes on the cut ends of the roll of material 12 as desired. Common attachment mechanisms known in the art are used to removably attach the appropriate finishing device 44 as desired.

In a preferred embodiment, the finishing device 44 is selected from the group consisting of a rotary drum type cutter, a router type cutter, and a circular saw type cutter, and a sander. Each of these types of finishing devices is known in the art to remove small quantities of material from an item and provide accurate control over the removal of those portions of material.

In a preferred embodiment, the length of each finishing device 44 is at least as long as the radius 30 of the roll of material 12. In a more preferred embodiment, the length of each finishing device 44 is greater than the radius 30 of the roll of material 12. However, the length of the each finishing device 44 can be less than the radius 30 of the roll of material 12 and still adequately provide a finishing cut to the end of the roll of material 12.

Figure 13A:
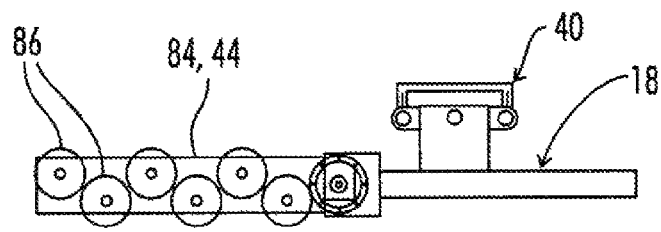
FIG. 13A shows a partial plan view of one embodiment of the cutting guides and the positioning guides used in the conjunction with router type cutting element of the current invention.
Figure 13B:
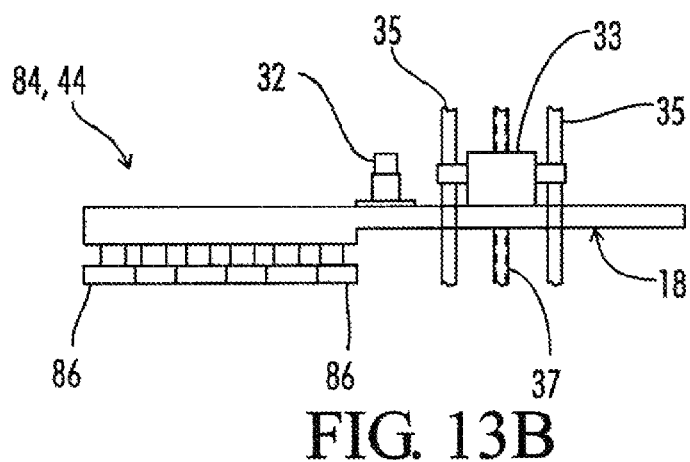
FIG. 13B shows a partial side view of the router type cutting element shown in FIG. 13A.

FIGS. 13A and 13B show details for the router type cutter 84 configured to include multiple router blades 86. In a preferred embodiment, the overall length "L" of the router type cutter 84 can be slightly greater than the radius 30 of the roll cutter 84 in order to cut across the entire roll of material 12 in one revolution of the roll of material 12. In a preferred embodiment, the multiple router blades 86 each have a diameter "D" and are positioned in parallel rows in an offset configuration to cause each of the cutting paths (not shown) of the multiple router blades 86 to overlap as the roll of material 12 is rotated. The router type cutter 84 may be powered by a single motor (not shown) or each router blade 86 may be powered by individual motors (not shown).

FIGS. 14A and 14B show a planner type cutter 88, also known as a drum type cutter 88. The planer cutter 88 may have straight or spiraled blades (not shown) depending upon the material being cut.

FIGS. 15A and 15B show a circular blade cutter 90 used as the finishing device 44. The circular blade cutter 90 can be replaced by a circular sander as dictated by the preferences of the user and the type of material being cut.

The apparatus 10 can include numerous safety features designed to facilitate the cutting of the roll of material 12. For example, it is necessary to prevent excessive forces being applied to the roll of material 12 such as might result from a dull cutting element 14 or 44, or that might be encountered when cutting various materials. This cutting force maybe limited by various means, including an output torque regulator (not shown) on the motor 42. Thus, when excessive cutting resistance is encountered the advancement of the cutting devise is limited so as to prevent movement or possible overturning of the roll of material 12 being cut.

FIG. 2 shows an alternate embodiment of the apparatus 10. In this embodiment, the support 20 includes a platform 50, also known as a pier 50, which is used to support the roll of material 12 in a stationary manner. A turntable 66 is shown including a plurality of support beams 52 supported on a bearing hub (not shown). The support beams 52 are centrally attached to the bearing hub and are used to support the various elements of the apparatus 10. For example, one side of the support beams 52 are used to support a particle collection device 46 and the power unit 43 while the opposite ends of the same support beams 52 are used to support a stanchion 38 and its associated guides 18 and 40 and cutting elements 16 and 44.

The stanchions 38 are equipped with jack screws (not shown) and hold down bolts 64 that are used during the assembly of the apparatus 10 to align the towers 38 be affixed perpendicular to the support beams 52.

This embodiment also includes a particle collection device 46 and operator platform 56. The particle collection device 46, also known as a material collector 46 and a dust collector 46, is used to collect the particles of material produce when the cutting elements 14 and 44 engage the roll of material 12. The particle collection device 46 comprises a motor (not shown), blower (not shown), ducts (not shown), and bags (not shown) for collection of the particles generated by the cutting devices 14 and 44 during the operation of the apparatus 10. The suction end (not shown) of the particle collection device 46 can be located at numerous positions on the apparatus 10 such that the suction end is proximate to the cutting elements 14 and 44 when the cutting elements 14 and 44 and in operation. Ducts can connect the suction end to the bags. Support beams 52 are used to support the particle collection device 46.

Support beams 53 can be used to support an operator area 56 and operator lift 58. The operator area 56 and operator lift 58 are used to house and maneuver a user of the apparatus 10 during operation of the apparatus 10. Also located in the operator area 56 are the master controls 60 for the apparatus 10.

Collectively turntable 66 and support beams 52 and 53 can be rotated in either a clockwise or counterclockwise direction with respect to the support 20. This rotation allows the cutting elements 14 and 44 to cut the roll of material 12 that should be placed on the platform 50. The turntable 66 includes an electrical slip ring (not shown) that allows the conduction of electrical power from an external source (not shown) to the rotating elements of the apparatus 10.

In this embodiment of the invention, the particle collection device 46, in conjunction with the power unit 43, acts a counterbalancing force to the cutting elements 14 and 44 during the rotation of the apparatus 10. This counterbalance force allows a stable rotation of the operator area 56 and the cutting elements 14 and 44 of the apparatus 10 around the roll of material 12.

In this embodiment, various additional motion imparting devices (not shown) can be used to power the particle collection device 46, the chainsaw 14, the finishing device 14, the operator lift 58 and other powered elements of the apparatus 10. The operator area 56, cutting guide 18, positioning guide 40, and cutting elements 14 and 44 can be operated by devices known in the art to create linear motion, including, but not limited to, hydraulic cylinders, motors, pistons, chain links, rack and pinions gears and the like. The power unit 43 can house these additional motion imparting devices, or these devices can be located proximate to the devices upon which they transfer energy.

The fact that the towers 38 of this embodiment of the apparatus 10 rotate allows for the insertion of the roll of material 12 onto the apparatus 10 at any location in the 360 degree span of the apparatus 10. For example, if the supply of the rolls of materials 12 are limited such that the rolls 12 can only come from a specific direction, the elements of the apparatus 10 can be rotated such that the elements of the apparatus 10 can always be positioned to allow the rolls of material 12 to be loaded and unloaded from that particular direction. In the embodiment shown in FIG. 2, this direction would be opposite the operator area 56.

Figures 8A, 8B:
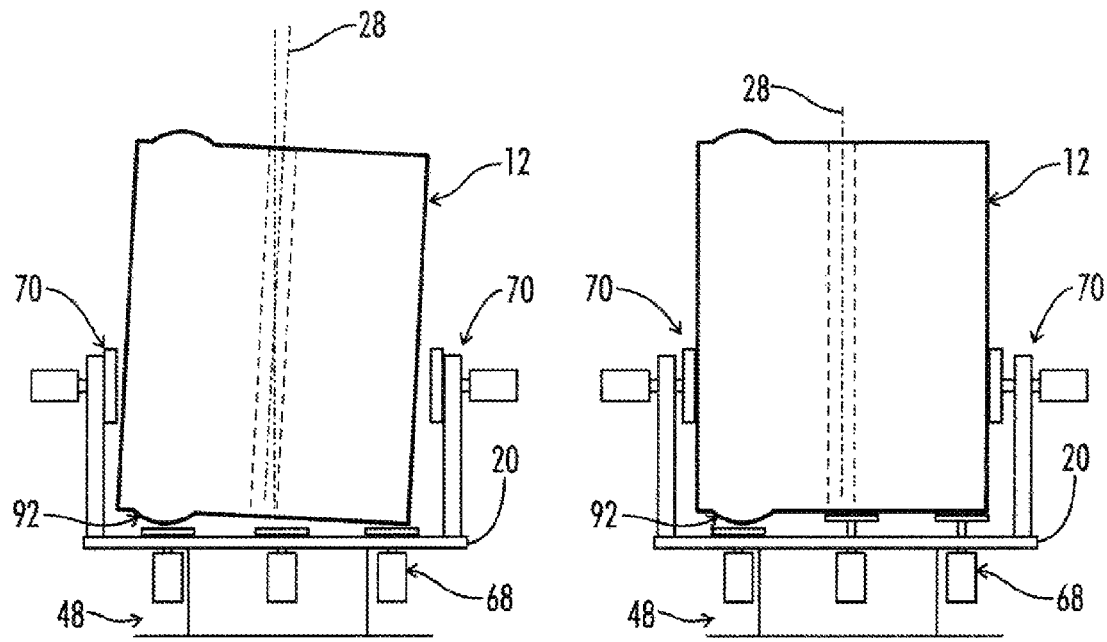
FIG. 8A is a side-view of one embodiment of the support of the current invention.
FIG. 8B shows a side-view similar to FIG. 8A.

As seen in FIGS. 8a and 8b, the apparatus 10 can cut rolls of material 12 that have irregular ends 29, or damaged ends 92. This accommodation is performed by adjustment pads 68 located on the support 20. Each adjustment pad 68 can increase in height to counteract deformities in the irregular end 29 of a roll of material 12. This adjustment allows the central axis 28 of the roll of material 12 to become substantially perpendicular to the housing 48 of the apparatus 10. This helps to insure a proper cut of the roll of material 12.

Figure 7:
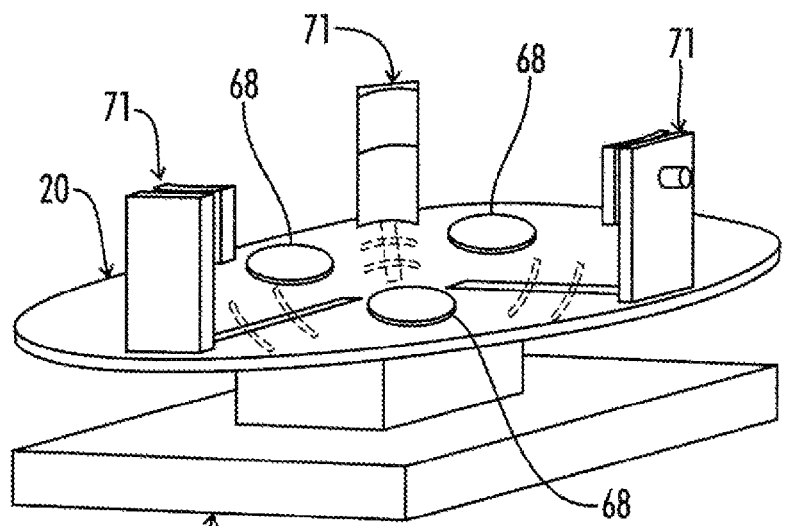
FIG. 7 is an isolated perspective view of one embodiment of the support.

Also included on the support 20 are peripheral clamps 70, also known as positioning clamps 70. These positioning clamps 70 are used to secure a roll of material 12 to the turntable 66 when the roll of material 12 is placed on the support 20. The positioning clamps 70 are designed to move radially inward on the support 20 to engage the exterior edge 26 or the circumference 26 of the roll of material 12 to secure the roll of material 12 onto the support 20. FIG. 7 shows alternate embodiments of the positioning clamps 71.

Figure 16A:
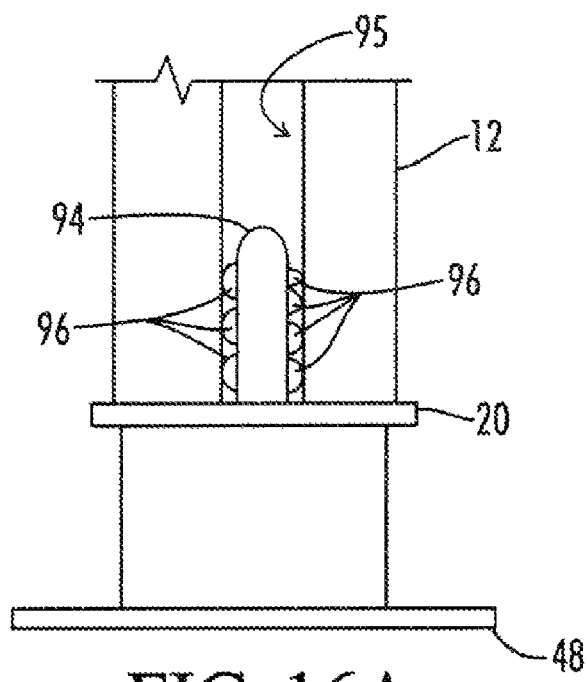
FIG. 16A shows a schematic cross-sectional view of one embodiment of the support shown with a centering pin used to align the roll of material.
Figure 16B:
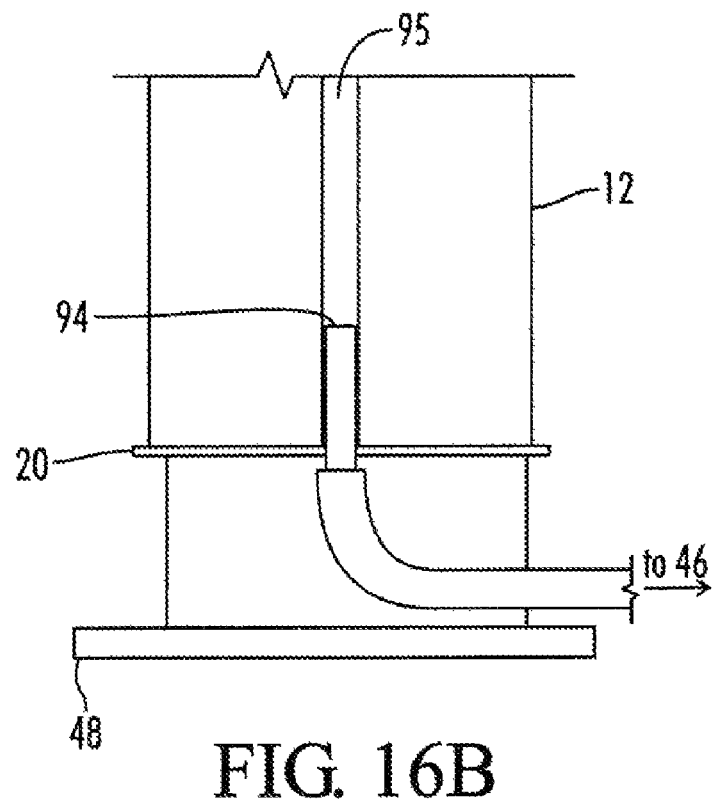
FIG. 16B shows a schematic cross-sectional view of an alternate attachment for the particle collection device on a centering pin.

FIG. 16A shows a schematic cross-sectional view of one embodiment of the support 20 shown with a centering pin 94 used to align a roll of material 12 with the support 20. The centering pin 94 can include ribs 96, which can also be call spines 96, which would extend to engage the interior 95 of the roll of material 12 to help secure the roll of material 12. FIG. 16B shows a schematic cross-sectional view of an alternate attachment location for the particle collection device 46. The alternate attachment is through the centering pin 96 which would be hollow.

Figure 9:
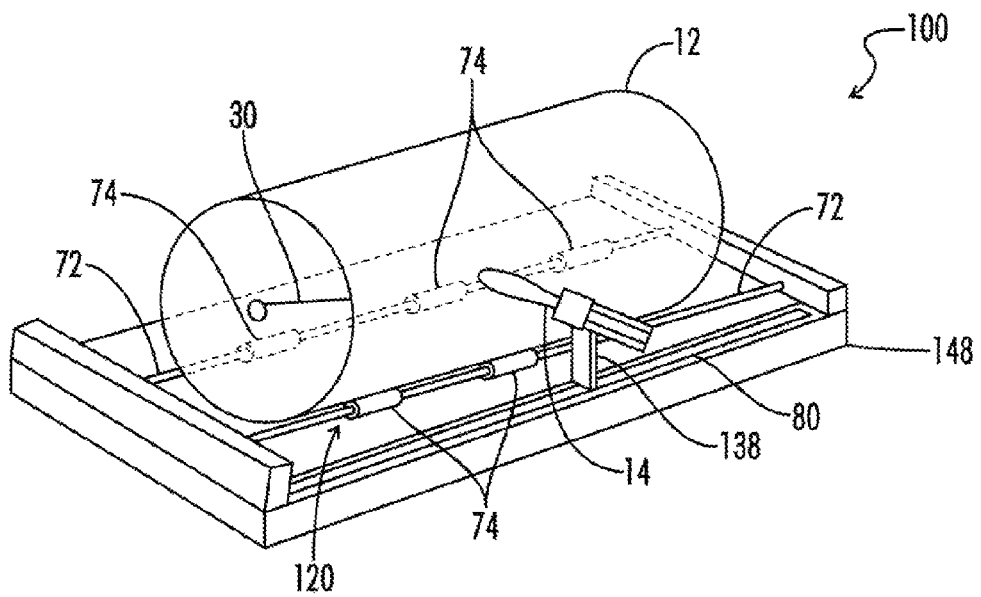
FIG. 9 is a schematic perspective view of a fifth alternate embodiment of the current invention shown with support wheel housed on support rails holding the roll of material with its central axis in a horizontal plane.

FIGS. 9-12 show still another alternative embodiment of the invention. FIG. 9 is a schematic of this embodiment with the apparatus generally designated by the numeral 100. The apparatus 100 is shown with a plurality of horizontal guide rails 72 affixed to housing 148. The plurality of horizontal guide rails 72 are attached to a plurality of support wheels 74, or support rollers 74. The elongated blade 14 is direct at the roll of material In this embodiment, the horizontal guide rails 72 and support wheels 74 comprise the support 120 of the apparatus 10. The support wheels 74 are used to hold the roll of material 12 as the roll of material 12 is cut by the apparatus 100. The support wheels 74 are adjustable along the length 102 of the horizontal guide rails 72 allowing positioning of the support wheels 74 as needed to support the entirety of the roll of material 12 or the specific sections of the roll of material 12 as the sections are cut from the roll of material 12. As the support rollers 74 are rotated, the roll of material 12 rotates about the axis 28 of the roll of material 12.

Figure 10:
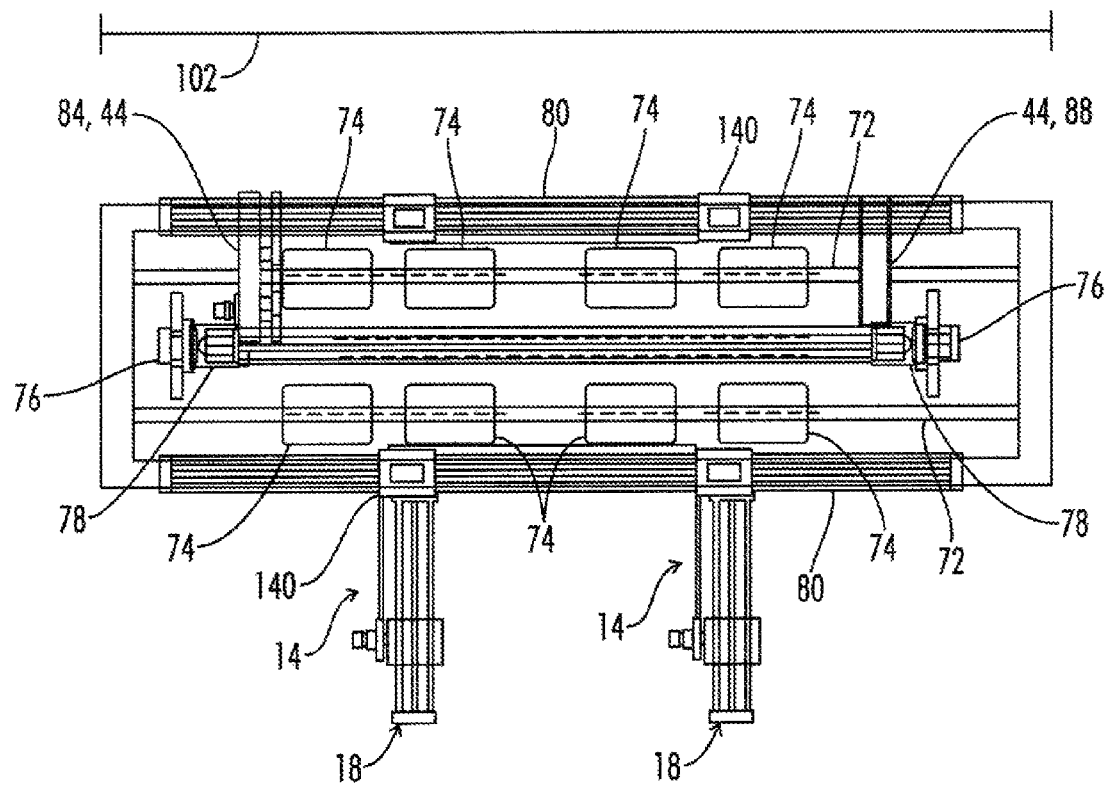
FIG. 10 is a plan view showing an alternate embodiment similar to the embodiment shown in FIG. 9.
Figure 11:
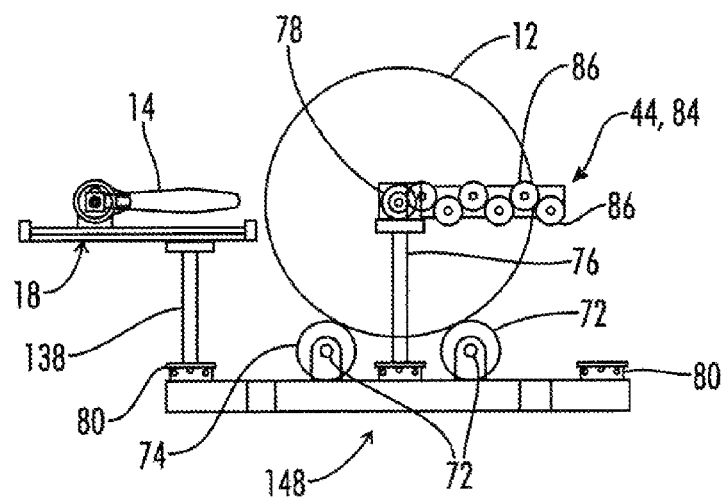
FIG. 11 is an end view showing an alternate embodiment similar to the embodiments shown in FIGS. 9 and 10.

As seen in FIGS. 10 and 11, also attached to the housing 148 are centrally located end supports 76. Attached to the end supports 76 are horizontally and vertically adjustable roll support spindles 78 that are designed to support and rotate the roll of material 12 from the central axis 28 of the roll of material 12. The roll support spindles 78 are horizontally and vertically adjustable using technology known in the art to linearly move objects. This adjustment of the roll of support spindles 78 allows the apparatus 10 to cut a variety of sizes of rolls of materials 12.

This embodiment includes a side rail 80 affixed to the housing 148 and located offset from the horizontal guide rails 72 and the support wheel 74. Attached to the side rail 80 are position guides 140 and stanchions 138. The position guides 140 are placed on the side rails 80 to allow adjustment of stanchions 138 with respect to the horizontal guide rails 72. The stanchions 138 support at least one cutting guide 118 and at least one cutting element 14 or 44. The combination of the cutting guide 118 and positioning guides 140 allow horizontal and vertical alignment and positioning of the cutting elements 14 and 44 with respect to the roll of material 12 when the roll of material 12 is placed on the apparatus 100.

Figure 12:
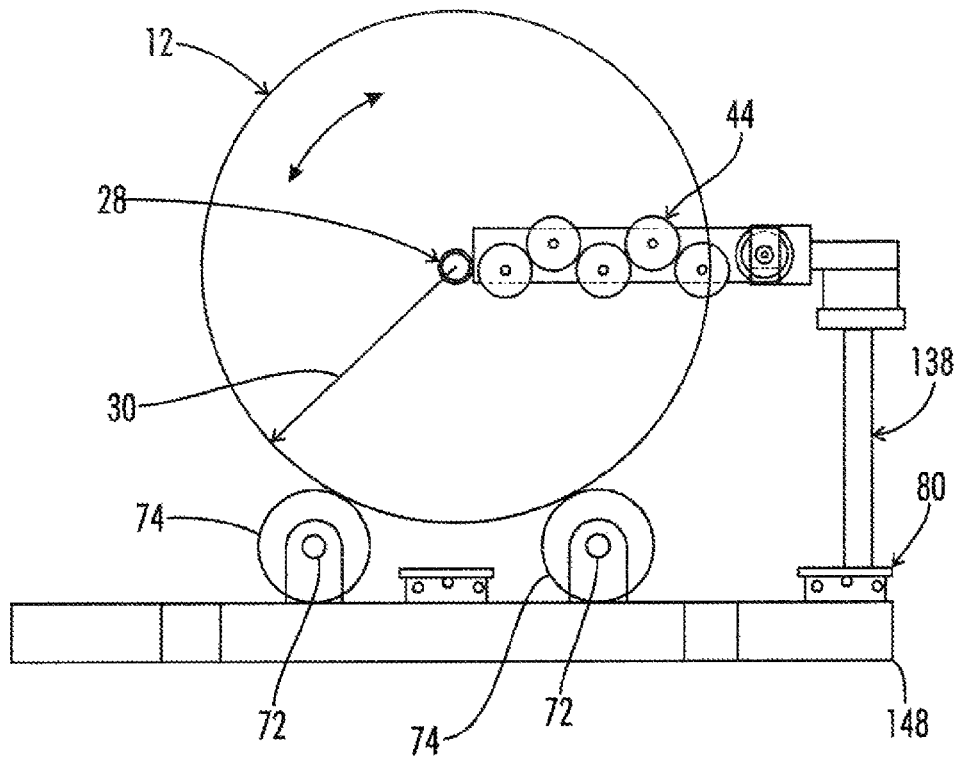
FIG. 12 is an end view showing an alternate embodiment similar to the embodiment shown in FIG. 11.

As seen in FIGS. 11 and 12, finishing devices 44 can be placed on the stanchions 138 supported by the side rails 80 or finishing devices 44 can be placed on the end supports 76 in order to produce a finished end to the roll of material 12.

As seen in FIG. 10, this embodiment can also include a second side rail 80 positioned parallel to the horizontal guide rail 72 and opposite the other side rail 80. This additional side rail 80 can allow additional stanchions 138, position guides 40, cutting guides 118, and cutting elements 14 and 44 to be used during the operation of the apparatus 10.

Methods of Operation

A method for cutting a roll of material 12 having an axis 28 and a circumference 26 is disclosed. As seen in FIG. 5A, the method teaches directing the distal end 16 of the elongated blade 14 toward the roll of material 12. The distal end 16 is the end of the elongated blade 14 that is located generally parallel to the shortest axis 17 of the elongated blade 14 and is substantially arcuate in shape. The method teaches plunge cutting the roll of material 12, which is defined as cutting the roll of material 12 with the portion of a chain that crosses the distal end 16 of the elongated blade 14. In a preferred embodiment, the method directs the distal end 16 of the elongated blade 14 to engage the circumference 26 in a substantially perpendicular manner. It can also be described that the cutting guide 18 directs the distal end 16 of the elongated end 14 at the central axis 28 of the roll of material 12 along a radius 30 of the roll of material 12. Thereby, the distal end 16 of the elongated blade 14 is the first portion of the elongated blade 14 of the apparatus 10 to engage the roll of material 12 as the apparatus 10 cuts the roll of material 12.

It is preferred that the plunge cut occurs along a radius 30 of the roll of material 12 and that it extends form the circumference 26 to the central axis 28 of the roll of material 12. However, it is possible to plunge cut the roll of material 12 wherein the elongated blade does not follow directly along the radius 30. The plunge cut does not have to terminate at the central axis 28, nor does the plunge cut have to be directed precisely at the central axis 28. Also, it is not a necessity that the elongated blade 14 perpendicularly intersects the roll of material 12 during the plunge cut. It is also possible to plunge cut the roll of material 12 to a depth such that the distal end 16 of the elongated blade 14 does not reach the central axis 28 of the roll of material 12.

Once the plunge cut is made, then the elongated blade 14 is rotated relative to the axis 28 to cut the rolled material 12. In an alternate method, the roll of material 12 is rotated relative the axis 28 to cut the roll of material 12. The roll of material 12 can be placed in either a horizontal or vertical plane in order to achieve the cutting method.

A user of the method would decide the dimensions of the roll of the material 12 that need to be cut before proceeding to cut the roll of material 12. Once this decision has been made, the elongated blade 14, also known as chainsaw 14, is used to plunge cut the roll of material 12. Once this initial cut is made, a user of the method has an option to rotate the elongated blade 14 in either direction, rotate the roll of material 12 in either direction, or to rotate both the roll of material 12 and the elongated blade 14 in opposite directions. In either case, a full revolution of either the elongated blade 14 or the roll of material 12, or a combination of both, will result in a section of the roll of material 12 being severed.

The roll of material 12 can be supported either on the ends of the roll of material 12 or along the circumference 26 of the roll of material 12.

The method further includes removing particles of material as the roll of material 12 is cut. This step of the method includes using a standard particle collection device 46 to collect the pieces of material as the pieces of material are cut or shaved from the roll of material 12 during the operation of the method.

After the initial cut has been made into the roll of material 12, an acute cutting, also known as finishing, of the roll of material 12 is performed. This acute cutting allows a user of the method to cut the roll of material 12 within specific tolerances that are needed for the roll of material 12 to be used for its intended purpose. During the finishing operation on the roll of material 12, the small particles of material are removed to facilitate proper cutting, cleaning, and appearance of the end of the roll of material.

As seen in FIG. 5B, the method also includes placing spacers 82 in between the sections of the roll of material 12 as the elongated blade 14 initially cuts the roll of material 12. The spacers 82 can be incrementally inserted in the kerf 83 created by the cutting of the roll of material 12 by the elongated blade 14. These wedge type spacers 82 are used to support to portion of the roll of material 12 that is severed to prevent damage to the roll of material 12 and to prevent the binding of the elongated blade 14. In a preferred embodiment of the method, there are four spacers 82 placed approximately 90 degrees apart along the circumference 26 of the roll of material 12 as the elongated blade 14 cuts the roll of material 12.

In an alternate embodiment of the method, a roll of material 12 is placed upon a support 20. Then an elongated blade 14 is aligned using position guides 40 and cutting guides 18 to direct the distal end 16 of the elongated blade 14 towards the central axis 28 of the roll of material 12 along a radius of the roll of material 12. It can also be described that this alignment is placing the distal end 16 of the elongated blade 14 to perpendicularly intersect the circumference 26 of the roll of material 12. The cutting guide 18 then directs the elongated blade 14 towards the central axis 28 to the roll of material 12. Along this path, the elongated blade 14 creates a radial cut into the roll of material 12 from the circumference 26 to the central axis 28. During this initial cut the particles of material are collected using a particle collection device 46.

Then the elongated blade 14 is rotated relative the central axis 28 in order to cut the roll of material 12. The particles of material that are generated during this cutting process remove particle collection device 46. Spacers 82 are incrementally inserted into the cut made by the elongated blade as the elongated blade rotates around the roll of material 12.

Once the elongated blade has completed its rotation the severed portion of the roll of material is removed and a finishing device is used and then the remaining portion of the roll of material is finally cut, or finished, to provide specific tolerances upon the roll of material as required for this use at the specific applications of the roll of material 12.

Finally, the remaining portion of the roll of material 12 is removed and used in its particular application.

In alternate embodiments of this alternate method, the elongated blade is held stationary while the roll of material is rotated about its axis. In still additional embodiments of this method both the roll of material 12 and the elongated blade 14 are rotated in opposite directions in order to complete the cut on the roll of material.

Thus, although there have been described particular embodiments of the present invention of a new and useful Plunge Cut Paper Roll Converter, it is not intended that such references be construed as limitations upon the scope of this invention except as set forth in the following claims.

What is claimed is:

1. A method for cutting a roll of sheet material, comprising:
   a) providing a chain saw having an elongated blade, said elongated blade comprising generally parallel elongated sides and a blade length, an end attached to a driving mechanism, a free distal end opposite the attached end having a blade width less than the blade length, and a chain crossing the free distal end length;
   b) advancing the free distal end of the elongated blade into the roll of sheet material to plunge cut the roll of sheet material by the chain crossing the free distal end from an outer circumference to a central axis along a linear insertion path that is substantially co-linear with a longitudinal axis of said elongated blade and cutting the roll of sheet material with the portion of the chain that crosses the free distal end of the elongated blade as that portion of the chain crosses the blade width of the free distal end of the elongated blade;
   c) holding the roll of material proximate to the elongated blade at only one end; and
   d) adjusting the position of a cutting guide and the elongated blade relative to the roll of material using at least one positioning guide.

2. The method of claim 1, further including removing particles of material as the roll of material is cut.

3. The method of claim 1, further including acutely cutting the roll of material using a finishing device.

4. The method of claim 1, further including after step b), rotating the roll of material relative to the elongated blade to cut the roll of material.

5. The method of claim 1, further including vertically orientating the roll of material.

6. The method of claim 1, wherein the blade length is substantially perpendicular to the central axis of the roll.

7. The method of claim 1, wherein said blade width is positioned substantially parallel to a circumference of said roll and substantially transverse to the central axis of the role.

* * * * *